US011343039B2

(12) United States Patent
Wang et al.

(10) Patent No.: US 11,343,039 B2
(45) Date of Patent: May 24, 2022

(54) DEMODULATION REFERENCE SIGNALING FOR MINI-SLOTS

(71) Applicant: Telefonaktiebolaget LM Ericsson (publ), Stockholm (SE)

(72) Inventors: Zhao Wang, Solna (SE); Robert Baldemair, Solna (SE); Stefan Parkvall, Bromma (SE); Karl Werner, Segeltorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 16/610,768

(22) PCT Filed: May 15, 2017

(86) PCT No.: PCT/SE2017/050503
§ 371 (c)(1),
(2) Date: Nov. 4, 2019

(87) PCT Pub. No.: WO2018/212689
PCT Pub. Date: Nov. 22, 2018

(65) Prior Publication Data
US 2021/0160026 A1    May 27, 2021

(51) Int. Cl.
*H04L 5/00*    (2006.01)
*H04W 72/04*    (2009.01)

(52) U.S. Cl.
CPC .......... *H04L 5/0048* (2013.01); *H04L 5/0094* (2013.01); *H04W 72/0446* (2013.01)

(58) Field of Classification Search
CPC . H04L 5/0048; H04L 5/0094; H04W 72/0446
See application file for complete search history.

(56) References Cited

U.S. PATENT DOCUMENTS

| 2008/0181193 | A1 | 7/2008 | Yoshida et al. |
| 2010/0226342 | A1 | 9/2010 | Colling et al. |
| 2010/0309805 | A1 | 12/2010 | Jones, Jr. et al. |
| 2017/0264408 | A1* | 9/2017 | Patel ..................... H04L 5/0051 |

FOREIGN PATENT DOCUMENTS

| CN | 101897159 A | 11/2010 |
| CN | 101944971 A | 1/2011 |
| CN | 101971571 A | 2/2011 |

(Continued)

OTHER PUBLICATIONS

R1-1612120, MediaTek, 'DL Control Channel Design for NR', 3GPP TSG RAN WG1 Meeting #87, Nov. 14-18, 2016, pp. 1-4. (Year: 2016).*

(Continued)

*Primary Examiner* — Melvin C Marcelo
(74) *Attorney, Agent, or Firm* — Christopher & Weisberg, P.A.

(57) ABSTRACT

There is disclosed a method of operating a radio node in a radio access network. The method includes transmitting and/or receiving reference signaling in a mini-slot, the timing of the reference signaling being determined based on a structure configuration of a transmission timing structure relative to which the mini-slot is positioned. The disclosure also pertains to related devices and methods.

18 Claims, 12 Drawing Sheets

(56) References Cited

FOREIGN PATENT DOCUMENTS

| CN | 102123515 A | 7/2011 |
|---|---|---|
| CN | 102378390 A | 3/2012 |
| CN | 102638901 A | 8/2012 |
| CN | 102893569 A | 1/2013 |
| FR | 3031271 A1 | 7/2016 |
| KR | 20130055787 A | 5/2013 |
| WO | 2014084463 A1 | 6/2014 |
| WO | 2018212689 A1 | 11/2018 |

OTHER PUBLICATIONS

R1-1610129, Qualcomm, 'Summary of [86-19] Discussion on Slot Structure Use Cases', 3GPP TSG-RAN WG1 #86bis, Oct. 10-14, 2016, pp. 1-20. (Year: 2016).*
R1-1608964, ZTE, 'About Slot structure and Scheduling Units for NR', 3GPP TSG RAN WG1 Meeting #86bis, Oct. 10-14, 2016, pp. 1-8. (Year: 2016).*
R1-1704219, Huawei, HiSilicon, 'Overview on mini-slot design', Apr. 3-7, 2017, 3GPP TSG RAN WG1 88bis Meeting, pp. 1-8. (Year: 2017).*
International Search Report and Written Opinion dated Jan. 31, 2018 issued in PCT Application No. PCT/SE2017/050503, consisting of 10 pages.
Huawei et al: "Unified design for slot and mini-slot",3GPP Draft; RI-1708121 , May 14, 2017; XP051273317; consisting of 8 pages.
Chinese Office Action with English Summary Translation dated Dec. 2, 2021 for Patent Application No. 201780090819.3, consisting of 14-pages.
3GPP TSG RAN WG1 Meeting #87 R1-1612120; Title: DL Control Channel Design for NR; Agenda Item: 7.1.1; Source: Media Tek Inc.; Document for: Discussion; Date and Location: Nov. 14-18, 2016, Reno, USA, consisting of 4-pages.
3GPP TSG RAN WG1 NR Ad-Hoc Meeting R1-1700381; Title: Demodulation reference signals design aspects for URLLC mini-slots; Agenda Item: 5.1.4; Source: Intel Corporation; Document for: Discussion and Decision; Date and Location: Jan. 16-20, 2017, Spokane, USA, consisting of 8-pages.
3GPP TSG-RAN WG1 Meeting #88 R1-1703315; Title: Dynamic reuse of DL control resources for data in NR; Agenda Item: 8.1.3.1.5; Source: Nokia, Alcatel-Lucent Shanghai Bell; Document for: Discussion and Decision; Date and Location: Feb. 13-17, 2017, Athens, Greece, consisting of 5-pages.
3GPP TSG RAN WG1 88bis Meeting R1-1704219; Title: Overview on mini-slot design; Agenda Item: 8.1.10; Source: Huawei, HiSilicon; Document for: Discussion and decision; Date and Location: Apr. 3-7, 2017, Spokane, USA, consisting of 8-pages.
3GPP TSG RAN WG1 Meeting #88bis R1-1704324; Title: Mini-slot based DL/UL data scheduling mechanisms in NR; Agenda Item: 8.1.3.3.1; Source: AT&T; Document for: Discussion/Approval; Date and Location: Apr. 3-7, 2017, Spokane, USA, consisting of 5-pages.

* cited by examiner

Case A: Multiplexing of DM-RS at same symbols

Case B: Muting data of slot-based transmission at the DM-RS position of mini-slot

DEMODULATION REFERENCE SIGNALING FOR MINI-SLOTS

CROSS-REFERENCE TO RELATED APPLICATIONS

This Application is a Submission Under 35 U.S.C. § 371 for U.S. National Stage Patent Application of International Application Number: PCT/SE2017/050503, filed May 15, 2017 entitled "DEMODULATION REFERENCE SIGNALING FOR MINI-SLOTS," the entirety of which is incorporated herein by reference.

TECHNICAL FIELD

The present disclosure pertains to wireless communication technology, in particular to DMRS (Demodulation Reference Signaling) in radio access networks (RANs), for example a NR (New Radio, a 3GPP telecommunication standard) RAN.

BACKGROUND

Modern wireless communication technology, in particular NR, aims at a broad range of use cases, requiring corresponding communication systems and networks to allow flexibility in signaling. Flexibility, however, might come at the price of increases signaling, in particular control signaling, which may lead to undesired signaling overhead.

Many wireless communications use DMRS, in particular to improve demodulation processes. DMRS may be considered (in particular, UE-specific) reference signaling facilitating channel estimation and/or demodulation, which may be in particular be provided in context with scheduled (data signaling). With flexible scheduling of signaling, there have to be found ways to reliably provide DMRS or other reference signaling without unduly increasing signaling overhead, in particular for signaling configuring the DMRS (control signaling).

SUMMARY

It is an object of this disclosure to provide approaches allowing efficient use of reference signaling in particular in the context of mini-slot transmissions, limiting the required control signaling. The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later.

Accordingly, there is disclosed a method of operating a radio node in a radio access network. The method comprises transmitting or receiving reference signaling in a mini-slot, the timing of the reference signaling being determined based on a structure configuration of a transmission timing structure relative to which the mini-slot is positioned.

Moreover, there is disclosed a radio node for a radio access network. The radio node is adapted for transmitting or receiving reference signaling in a mini-slot, the timing of the reference signaling being determined based on a structure configuration of a transmission timing structure relative to which the mini-slot is positioned. The radio node may comprise, and/or be adapted for utilising, processing circuitry and/or radio circuitry, in particular a transmitter and/or receiver and/or transceiver, for such transmitting and/or receiving. Alternatively or additionally, the radio node may comprise a transmitting and/or receiving module for such transmitting and/or receiving.

The approaches described herein facilitate efficient use of reference signaling. In particular, control signaling specifically configuring timing for reference signaling in the mini-slot may be limited or omitted. Also, interferences arising due to mini-slot transmissions may be limited.

A mini-slot may cover, and/or have, and/or be scheduled for, a mini-slot time interval (or mini-slot duration), which may cover, and/or comprise, and/or comprise of, and/or be associated to, a plurality of symbol time intervals (also referred to as symbols or symbol intervals). The associated symbols in the mini-slot may be consecutive in time. Generally, symbols defining and/or comprised in a transmission timing structure may be consecutive, in particular in a mini-slot or slot.

The mini-slot may represent and/or comprise an associated transmission (which may have one or more components, e.g. associated to one or more messages and/or channels). Mini-slot transmission/s may cover and/or be scheduled for, and/or scheduled or positioned within, the mini-slot time interval. To a mini-slot, there may be associated and/or scheduled time resources and/or frequency resources. The time resources may be represented by the mini-slot time interval. The frequency resources may be represented by one or more subcarriers, and/or subcarrier groups, which may be consecutive in frequency domain. The resources for a mini-slot may be configured and/or scheduled by a radio node, e.g. a network node. The mini-slot transmission may comprise data and/or control signaling, e.g. on one or more associated channels.

A data channel may for example be a physical data channel, e.g. a dedicated or shared channel, in particular a physical uplink shared channel like a PUSCH, or a physical downlink shared channel like a PDSCH. A control channel may for example be a physical control channel, e.g. a dedicated or shared channel, in particular a physical uplink control channel like a PUCCH, or a physical downlink control channel like a PDCCH. A mini-slot transmission may in particular represent a short format of transmission associated to a channel, e.g. a short PUCCH format or a short PDCCH format or a short PUSCH format or a short PDSCH format. Such a format may be comprised in, and/or pertain to, and/or be scheduled for, and/or be associated to, a mini-slot time interval of 2 or 3 symbol time intervals. It should be noted that one of the symbols may be associated to the reference signaling, and the other symbol/s may be associated to the content (e.g., data or control signaling) of the format.

The radio node may be a user equipment or a network node, in particular a base station or gNodeB or eNodeB. The transmission timing structure may in particular be a slot, or a slot grouping comprising one or more consecutive (in time) slots.

It may be considered that the reference signaling may be demodulation reference signaling, in particular DM-RS signaling, and/or UE-specific reference signaling. Such reference signaling may be associated to the transmission of the mini-slot, in particular data and/or control signaling. The reference signaling may be modulated and/or encoded, and/or be a reference for channel estimation and/or transmission quality, and/or be associated to data and/or control signaling of the mini-slot.

Generally, the mini-slot may be transmitted in downlink or uplink or sidelink. For a radio node implemented as user equipment, the mini-slot may be associated to transmission in uplink or sidelink, or reception in downlink or sidelink. For a radio node implemented 100 as network node, the mini-slot may be associated to reception in uplink, or transmission in downlink.

Receiving reference signaling in a mini-slot may comprise expecting corresponding signaling, and/or associating and/or processing signaling received in associated resources and/or symbol time interval/s with reference signaling.

The timing of signaling, and/or a related timing structure, e.g. the mini-slot, may generally be represented by one or more borders in time, and/or a duration. A border may generally be indicated by a border symbol, e.g. a starting symbol for a start, and/or an ending symbol for an end. The duration (or length) may be indicated or represented by a number of symbols (which may include the border symbol/s). The timing may be indicated relative to a reference, e.g. a timing structure or timing grid, in particular a transmission timing structure, e.g. like a slot or slot grouping. Such a reference may be provided by a symbol of the transmission timing structure. In general, the symbols of a mini-slot may be synchronised to the symbols of the transmission timing structure, e.g. such the starting times and/or end times coincide in time. The symbols of a mini-slot may have the same duration as the symbols of the transmission timing structure. It may be considered in this context that the timing of reference signaling is represented by symbols of the transmission timing structure.

The structure configuration in general may a indicate a timing of structure reference signaling, and/or indicate a timing structure or grid, and/or positions and/or timing of (possible) signaling therein, e.g. reference signaling and/or control signaling and/or data signaling. The configuration may in particular indicate a control region and/or timing of reference signaling like DM-RS for a transmission timing structure, e.g. one or more time and/or frequency resources. The structure reference signaling may be signaling in, and/or scheduled for, the transmission timing structure. The structure configuration may indicate a timing of structure reference signaling scheduled for transmission, or indicate a general configuration, e.g. without necessarily scheduling a transmission for a transmission timing structure in which the mini-slot is transmitted. In this case, the transmission timing structure may indicate a timing grid. In some cases, the structure configuration may indicate frequency resources for structure reference signaling. Structure reference signaling may indicate reference signaling associated to the transmission timing structure, in particular time/frequency resources associated thereto. The structure configuration may be determined by a network node, and/or indicated by control signaling, e.g. downlink control signaling and/or downlink control information like DCI, or higher layer signaling, e.g. Radio Resource Control layer signaling (RRC signaling).

In some variants, the timing of reference signaling may coincide with an indicated timing of structure reference signaling. Accordingly, reference signaling in the mini-slot may have a timing and/or overlap in time of structure reference signaling. Accordingly, resources for reference signaling may be used consistently, in particular without requiring specific control signaling configuring the timing of the reference signaling of the mini-slot.

A transmission timing structure may comprise one or more mini-slots, which may have different or the same mini-slot time intervals.

In some variants, the reference signaling in the mini-slot may be multiplexed with structure reference signaling. Accordingly, such structure reference signaling may be scheduled and/or actual signaling. Multiplexing reference signaling with structure reference signaling may comprise frequency and/or code multiplexing, and/or using the same resources, in particular frequency and/or time resources, for the multiplexed signaling. Multiplexed signaling may in particular use the same time resource and/or symbol/s in time and/or timing. Alternatively or additionally, structure reference signaling indicated by the structure configuration may be muted if it coincides in timing with the reference signaling, in particular if the signalings coincide in frequency and/or use one or more identical frequency resources, e.g. subcarriers.

It may be considered that the reference signaling may be associated to signaling on a physical channel in the mini-slot. The channel may be demodulated and/or demodulatable and/or estimated and/or estimatable based on the reference signaling.

A channel estimate may generally indicate the quality of reception of signaling on the channel, e.g. in terms of error rate, e.g. block error rate and/or missed signals, and/or signal strength or quality and/or interference and/or noise, e.g. Signal-to-Noise Ratio, or Signal-to-Interference Ratio, and/or Signal-to-Interference and Noise Ratio, or a similar parameter.

In some variants, a transmission parameter of the reference signaling may be determined based on the structure configuration. A transmission parameter of the reference signaling may in particular pertain to modulation and/or encoding and/or frequency domain and/or frequency distribution.

The mini-slot may be scheduled for transmission having a position in time or timing relative to the transmission timing structure.

In particular, the transmission timing structure may define a timing grid. Alternatively or additionally, the transmission timing structure may be associated to a scheduled transmission in the transmission timing structure, e.g. indicated by the structure configuration.

A timing structure of the mini-slot and/or the transmission timing structure may be based on a symbol time length, the symbol time length depending on a numerology.

Alternatively, or additionally, the symbol time length of symbols of the mini-slot and/or the transmission timing structure may be based on a numerology. The numerology may be the same for the transmission timing structure and the mini-slot.

Generally, the transmission timing structure may be longer in time than the mini-slot, and/or the mini-slot may be embedded (in time, or in time and frequency) in the transmission timing structure.

There is also discussed a program product comprising instructions causing processing circuitry to control and/or perform a method as described herein.

Moreover, a carrier medium arrangement carrying and/or storing a program product as described herein may be considered.

BRIEF DESCRIPTION OF THE DRAWINGS

The drawings are provided to illustrate concepts and approaches described herein, and are not intended to limit their scope. The drawings comprise.

DETAILED DESCRIPTION

LTE, 5G, channel estimation, demodulation, Ultra-reliable low latency communication (URLLC)

The physical layer of NR (the 3GPP 5G mobile radio systems) is expected to handle a vast number of different transmission scenarios by supporting multiple transmission numerologies, variable data transmission time intervals (as examples of transmission timing structures), and early decoding for latency critical applications.

Reference signals for coherent demodulation of physical layer control and data channels signals may be transmitted within an OFDM waveform (or a SC-FDM waveform). The reference signaling (RS) may be multiplexed with physical layer channel or related signaling, and/or may be mapped on the (e.g., OFDM) time-frequency resource grid as configured by the network. Demodulation can be based on reference signaling, e.g. on cell-specific RS (e.g. CRS) or UE-specific RS (e.g., DM-RS). The type of which RS to be used may depends on a configured transmission mode, or may be generally configured or configurable. CRS may be always on, e.g. be transmitted in every slot or sub-frame, and/or in every resource block. DM-RS may be configured in certain transmission modes, and/or may be intended to be specifically used by devices for channel estimation of coherent demodulation. Mapping of CRS on the time-frequency resource grid may dependent on a the transmit-antenna configuration and/or a cell-specific frequency shift, which may be derived during initial access. DM-RS mapping may depend on the number of MIMO-layers (Multiple-Input Multiple-Output, a multi-antenna operation scheme).

The UE-specifically configured DM-RS can be pre-coded in the same way as the corresponding physical layer channels, and/or dynamically adapt the number of MIMO-layers to the radio channel conditions. Precoding in this context may be considered to refer to applying amplitude and/or phase shifts on the transmission antennas, and/or to perform beamforming accordingly.

Packet data latency is a key performance metric that is regular measured by vendors and operators, but also end-users. In order to satisfy low latency requirements, short transmission timing structures like mini-slots may be used, which may be located within a time-frequency resource grid which may be defined by a network or network node, and/or be defined by a transmission timing structure grid, e.g. utilising slots.

NR will be using OFDM based waveforms (OFDM in downlink, OFDMA or SC-FDMA in uplink) with reference signals and physical layer channels mapped on a time-frequency resource grid. Reference signals for demodulation of physical layer channels or signaling may be based on UE-specifically configured DM-RS patterns that can support multiple transmission numerologies, variable data transmission time intervals and early decoding for latency critical applications.

Figure 1:
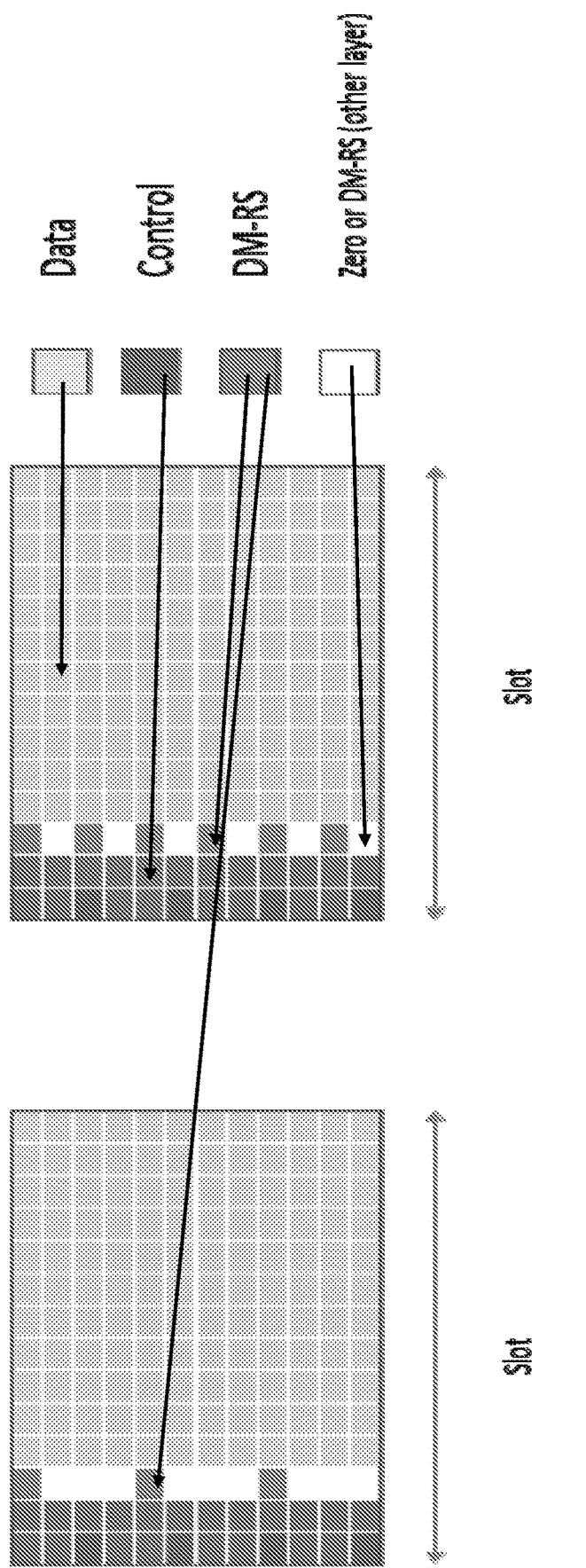
FIG. 1, showing exemplary DM-RS patterns in NR for supporting early decoding/low Doppler.

FIG. 1 shows exemplary DM-RS structures that may be provided for early decoding or for low Doppler/low UE mobility. The figure schematically shows a slot grid covering symbols in time domain and 12 subcarriers in frequency domain as a possible example of a transmission timing structure with frequency component, which may be generally referred to as resource block, which in this form covers 14×12 resource elements (the number of symbols may be different for different slot lengths, e.g. dependent on a cyclic prefix, and/or configurably or configured). As shown, the DM-RS may be transmitted directly after, or within, a control region of a slot.

In this structure, the early transmission of DM-RS enables demodulation and decoding of data to start almost directly after receiving the fourth OFDM symbol in the slot. Note that the Doppler (or Doppler shift) of signaling may be considered indicative of the relative speed between the UE and the network node (or between two communication radio nodes in general).

Figure 2:
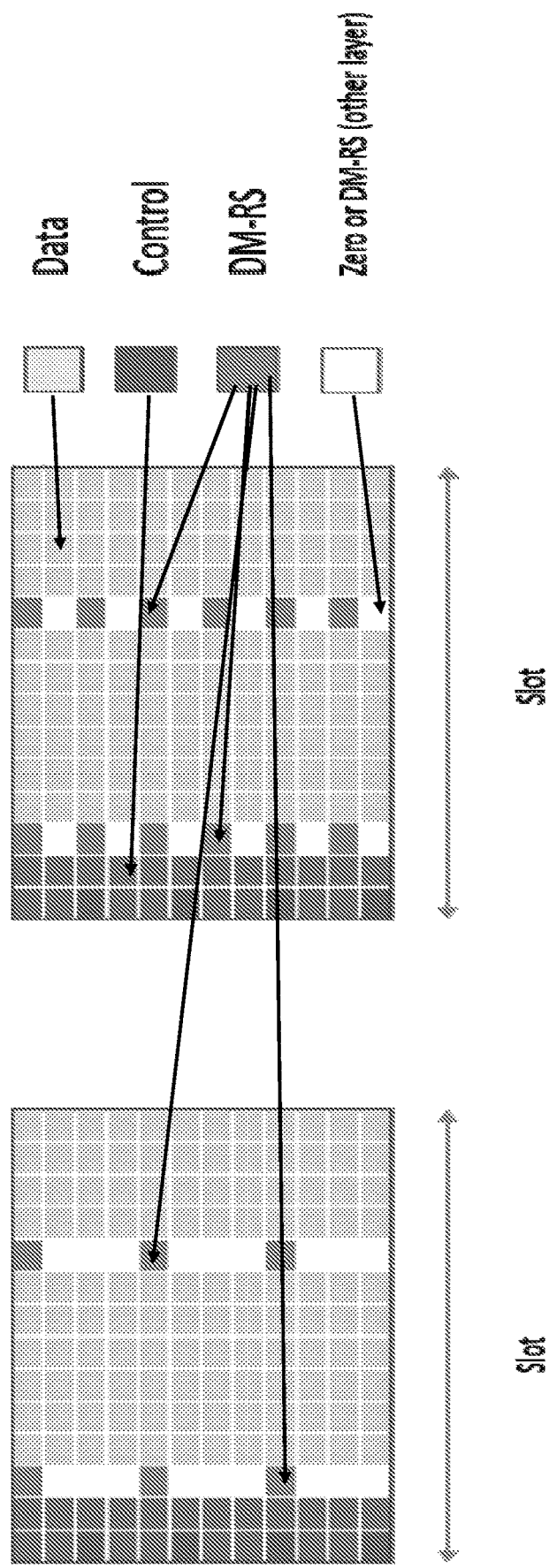
FIG. 2, showing exemplary DM-RS patterns in NR for supporting early decoding/high Doppler.

FIG. 2 shows an exemplary DM-RS structure for early decoding and high Doppler/high UE mobility.

Figure 3:
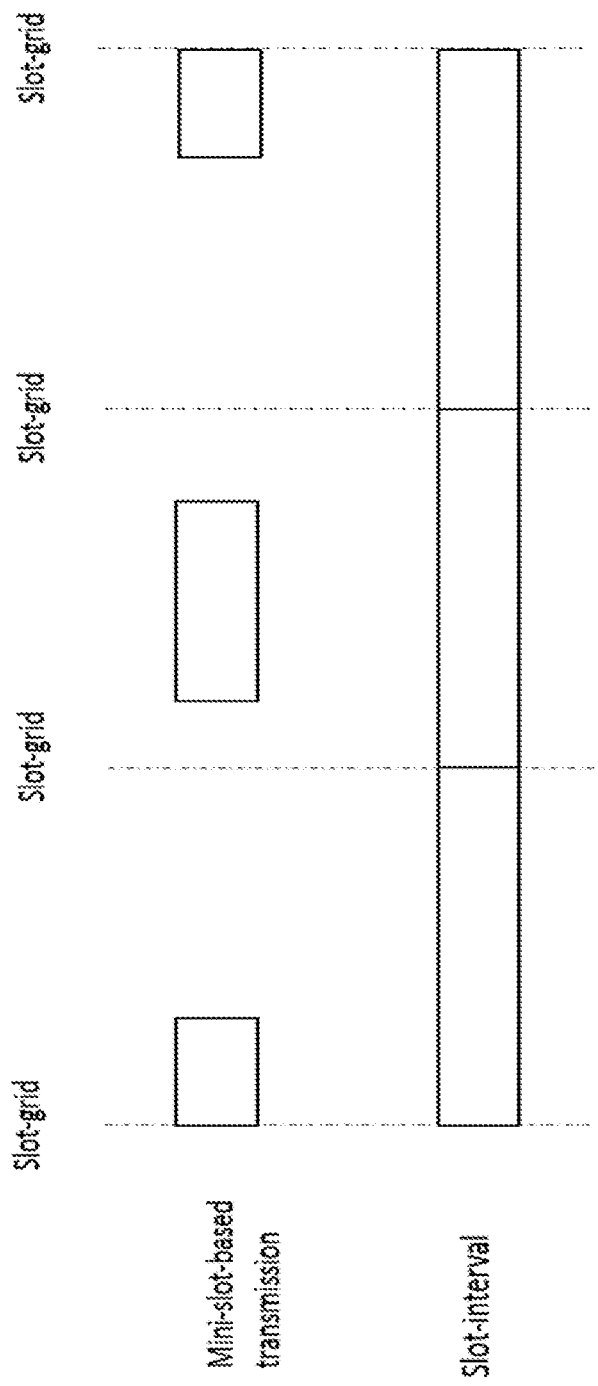
FIG. 3, showing exemplarily a slot-interval and mini-slot-based transmission within a slot-interval.

To handle low latency transmission, mini-slot based transmission is introduced in NR which is distinguished from slot-based transmission. A mini-slot in NR could be any length strictly less than the length of a slot (in time, e.g. configured or configurable), and/or greater or equal to 2 symbols. FIG. 3 shows some possible timing relations of mini-slot based transmission in NR relative to a regular length slot grid shown in FIG. 5. Generally, a mini-slot may start or end at a slot border in time domain, or be arranged within a slot without extending to a time border of the slot. There may be considered solutions in which a mini-slot extends beyond, and/or crosses, a slot border in time. A slot border in time may generally indicate a starting point or end point of a slot in time (respectively, of a corresponding symbol time interval, which may be referred to as slot interval). Mini-slot-based transmission generally can be of variable length, and/or may start and end at different positions within a slot interval. The flexible timing of mini-slot based transmission requires suitable approaches to related control signaling.

To facilitate efficient cancellation of interference from DM-RS, it may be considered that DM-RS from the interfering transmission inter with DM-RS (of other transmission, or replace such transmission).

Generally, it may be considered:

Mini-slot is a new concept introduced to NR. The relative timing position of a mini-slot in a regular slot grid is very flexible, which requires new approaches.

There is currently no DM-RS design available for mini-slot based transmission in NR to estimate channel for coherent demodulation.

There is generally suggested to design DM-RS for mini-slots such that the RS symbol position of the mini-slot will depend on at least one of the following: the mini-slot starting position in the slot-grid; and/or the mini-slot end position in the slot-grid, and/or the mini-slot length and/or a DM-RS pattern of regular slot in the slot-grid.

The DM-RS symbol position of a mini-slot may be aligned with the DM-RS position of the regular slot in the slot-grid, if such is possible (e.g., depending on location and/or length of the mini-slot), otherwise, DM-RS symbol position may be optimized according to the mini-slot length.

The proposed solution for designing DM-RS position of the mini-slot facilitates compatibility with the regular slot DM-RS position, e.g. which is interference friendly in some scenarios. Moreover, the proposed solution facilitates DM-RS design optimization regardless of the regular slot transmission when the compatibility is not feasible.

Figure 4:
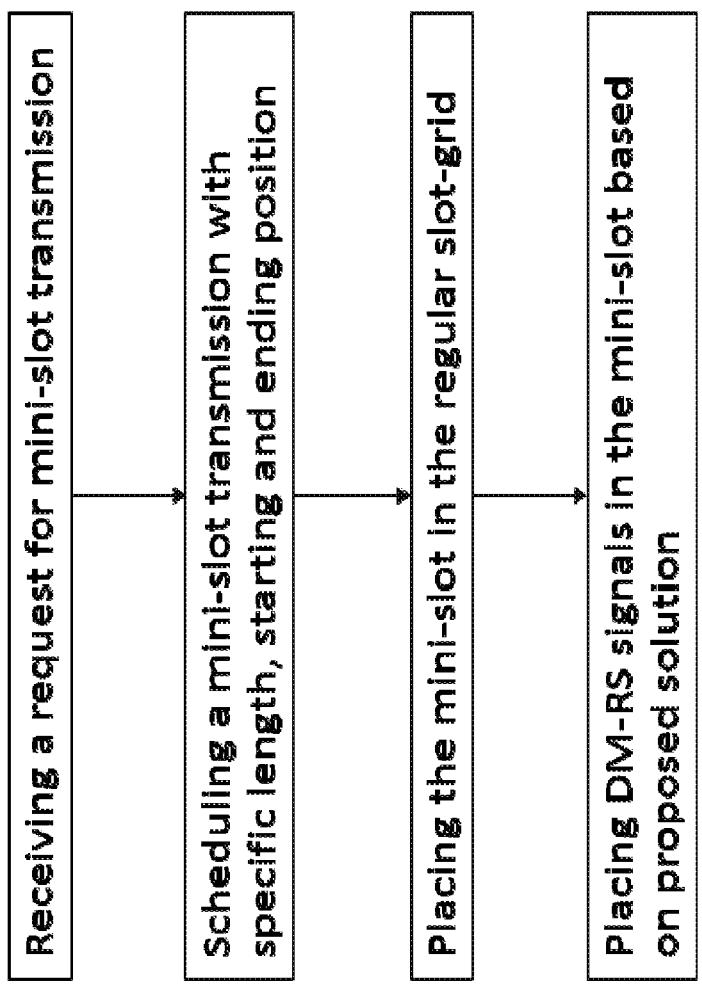
FIG. 4, showing a flow diagram of an exemplary algorithm related to DM-RS transmission.

FIG. 4 schematically shows exemplary action for an algorithmic implementation of a proposed design for mini-slot DM-RS position.

The proposed solution facilitates, inter alia, compatibility with regular slot-based transmission whenever the relative timing relation allows, and/or introduction of less optimization based on the regular slot-based transmission, and/or avoidance or limitation of data and reference signal collisions in the same symbol, e.g. when slot-based and mini-slot based transmission both exist in the same bandwidth, limiting possibility of interference e.g. at pilot positions, and/or optimisation of DM-RS patterns independent of regular slot-based transmission, when it is necessary or desired, and/or usage of DM-RS outside of the bandwidth of the mini-slot transmission for demodulation of the mini-slot, e.g. in case those DM-RS is precoded in the same way as the DM-RS of the mini-slot, e.g. reducing edge effects, which is beneficial for channel estimation accuracy.

In a typical variant, there exist a clear distinction of the timing structures for slot-based transmission and mini-slot based transmission.

Considering a slot-based transmission. A slot-interval has symbol length (in time) L, e.g., 7 or 14 symbols. The symbol index in this example has range [1:L].

For regular slot-based transmission, the DM-RS symbol position can be written as an indicator function:

$$1_{Rs}(x) = \begin{cases} 1, \forall x \in Rs \\ 0, \text{otherwise} \end{cases}$$

Figure 5:
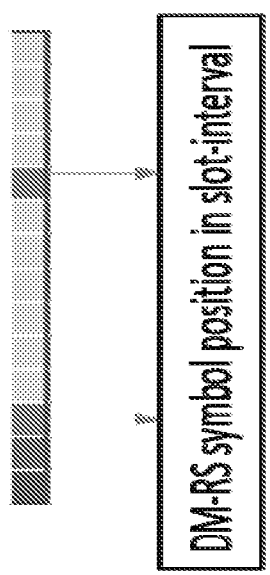
FIG. 5, showing an illustration of DM-RS symbol position when Rs={3,10}.
Figure 5:
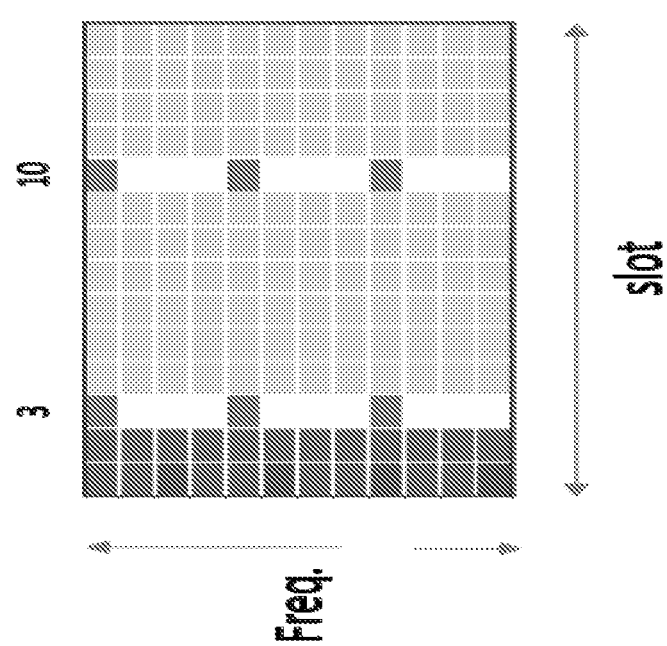

Rs represents the set of all possible DM-RS positions of regular slot-based transmission with respect to the indices of OFDM symbols. For example, Rs={3,10} in the following DM-RS pattern, which means that DM-RS is transmitted in symbols number 3 and 10, as shown in FIG. 5.

Figure 6:
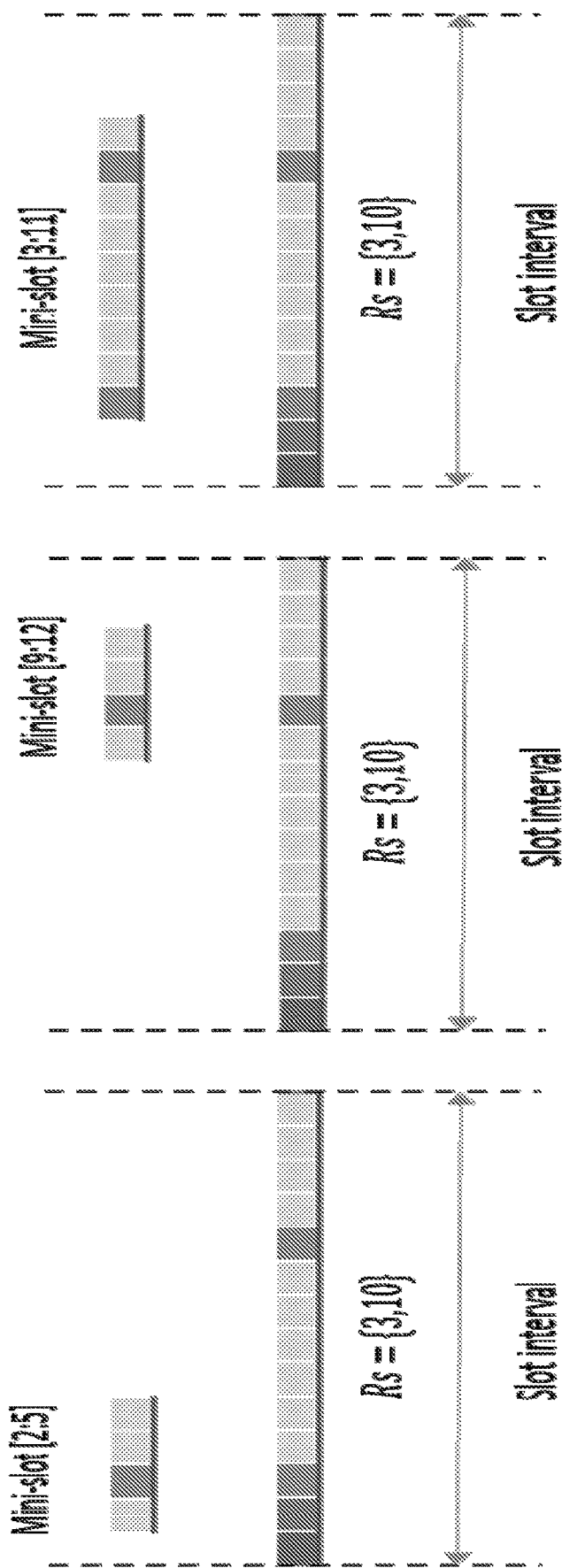
FIG. 6, showing exemplary mini-slot transmission.

A mini-slot starting from symbol a (1≤a≤L−1), ending at symbol b (a<b≤L−1), may be represented as mini-slot [a, b], where L is the regular-slot length, e.g. w.r.t OFDM symbols, e.g., 7 or 14. The DM-RS position in the mini-slot may be decided in the following way according to a proposed solution indicated in particular with reference to FIGS. 6 to 8:

Case A: if there exist one or multiple x∈[a, b], such that $1_{RS}(x)=1$, then the symbol position x will be the DM-RS position of the mini-slot (see FIG. 6 for examples). In other words, if there are regular-slot DM-RS symbols covered by the mini-slot transmission duration, the same DM-RS symbol positions will be kept in the mini-slot transmission. For instance, FIG. 6 illustrates the proposed solution in possible mini-slot transmission scenarios. In the cases shown, the properties of the mini-slot DM-RS may be adapted to transmission parameters or properties of DM-RS transmitted in regular-slot (in the same band or in adjacent bands), in particular frequency-domain, spatial or beam-forming related properties. Such properties may include transmission rank, transmission precoder, DM-RS sequence, and parameters affecting DM-RS placement in the resource grid (comb selection for example). These parameters may be determined from the configuration of the regular-slot transmission.

Figure 7:
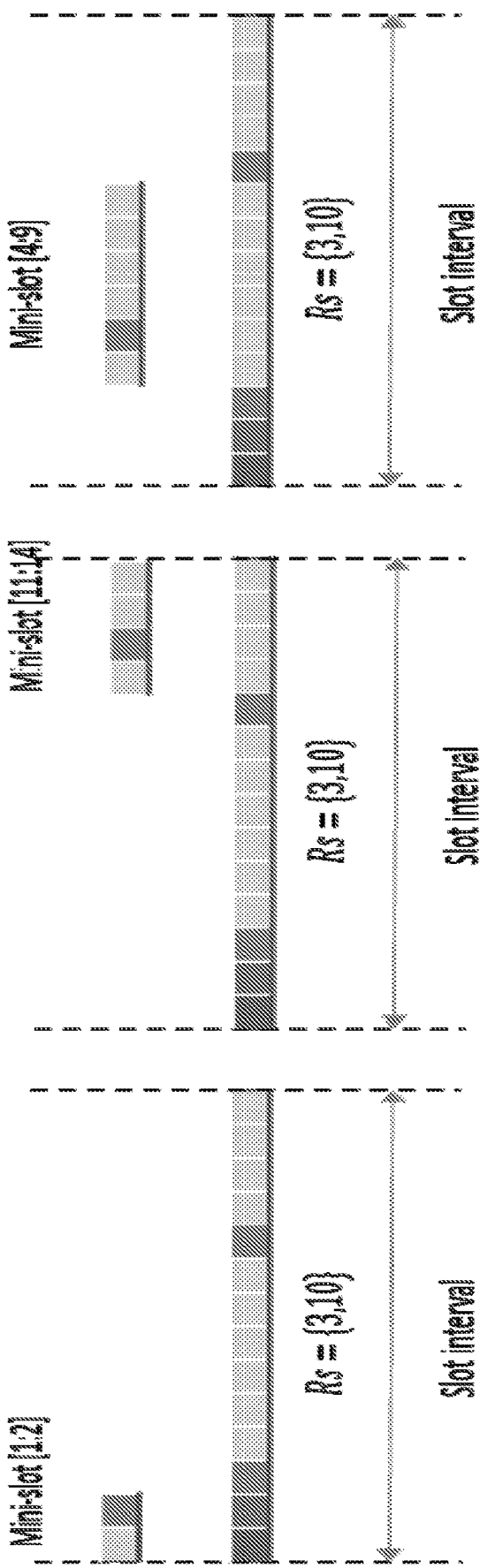
FIG. 7, showing exemplary mini-slot transmission.

Case B: for mini-slot transmission scenarios that are not included in case A, the DM-RS position in mini-slot may be optimized according to mini-slot design criteria, e.g. regardless of the regular slot based transmission. For example, it may hold for all x∈[a, b], $1_{RS}(x)=0$. Then DM-RS symbol position in the mini-slot [a, b], will be optimized according to its own transmission parameters, regardless of regular slot transmission. FIG. 7 illustrates a proposed solution for exemplary mini-slot not covering a DM-RS symbol of the regular slot.

Note that there may be considered occasions where one of the mini-slot symbols coincides with a DM-RS symbol of the regular transmission, but due to the requirements of the transmission of the mini-slot (e.g. resilience to Doppler, or reliability, link budget constraints) additional DM-RS need to be transmitted within the mini-slot. In some cases, these additional DM-RS may not be placed so that they coincide with DM-RS of the regular transmission. This creates a hybrid between case A and case B.

Figure 8:
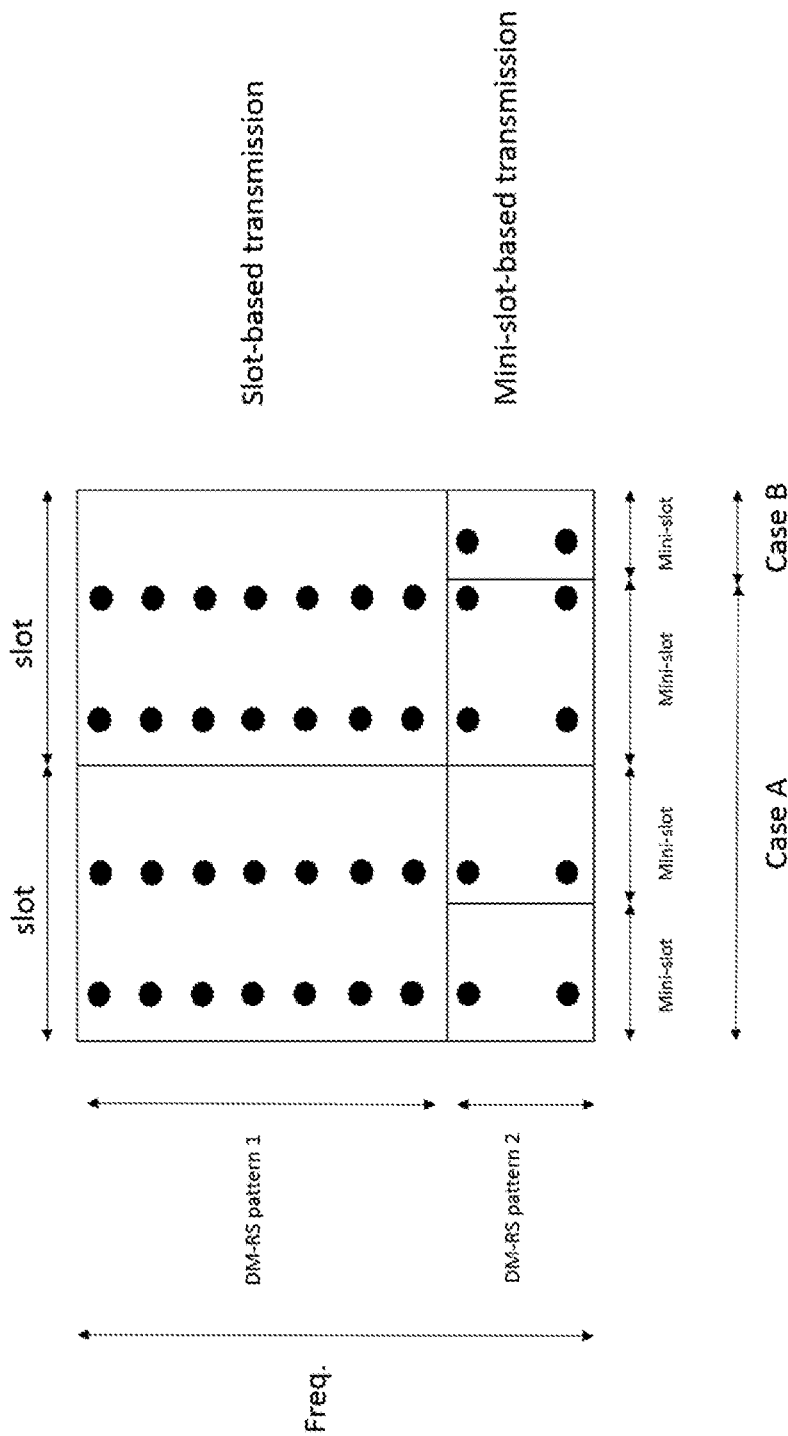
FIG. 8, showing an exemplary independent frequency domain DM-RS pattern optimization for mini-slot and slot-based transmission.

FIG. 8 illustrates a combination of cases A and B, in which different mini-slots are transmitted within a slot. In the first slot having a DM-RS pattern 1, two mini-slots are transmitted with associated DM-RS patterns 2, which align or coincide with pattern 1. In the second slot, there is transmitted a third mini-slot, with a pattern 2 that does not coincide with a regular slot pattern 1 in time. Note that the pattern 1 may not actually be transmitted (multiplexed), but may represent a generally configured or configurable pattern for a slot not actually used when transmitting the mini-slots.

There may be variants with no multiplexing of mini-slot based transmission and slot-based transmission in the same resource. If there is no multiplex of mini-slot and slot-based transmission in the same resource (e.g., no transmission scheduled for the slot except the mini-slot/s), the DM-RS pattern of the mini-slot can have the same timing/symbol position as the regular slot-based DM-RS, e.g., when it is possible due to the DM-RS pattern for a regular slot. Transmission parameters like frequency density may be adapted to the mini-slot, e.g. for quality of channel estimations, number of MIMO layers or users, etc. In other words, in case A and/or B, optimizations/adaptions may be applied in the frequency domain for DM-RS patterns.

For instance, while the regular slot-based transmission may have a comb factor N in the frequency domain for N layer transmission, the mini-slot based transmission can have comb factor different from N according to its own MIMO layer, as indicated e.g. in FIG. 8. A comb factor may generally indicate the number of subcarriers empty of reference signaling between two subcarriers carrying reference signaling on the same symbol interval.

Multiplex of mini-slot based transmission and slot-based transmission in the same resources (e.g., time and/or frequency) may be considered. In some variants, multiplexing of mini-slot based and slot based transmission in the same resource is suggested. For instance, in MU-MIMO scenarios, a slot based transmission may be intended for one user, and a mini-slot based transmission may be intended for another user.

In case A, the DM-RS pattern of mini-slot and slot in the same resource may be multiplexed such that in the receiver side the desired RS has favoured SINR.

In case B, the DM-RS pattern of mini-slot and signaling, e.g. data signaling, of a regular slot in the same resource may be multiplexed needs such that in the receiver side the desired RS has favoured SINR. Here, the multiplex method can also be "muting or nulling the data", muting the signaling scheduled for the (regular slot). It should be noted that a regular slot may represent a NR slot, and/or generally a transmission timing structure.

Regular slot based transmission in NR may be a base case for eMBB (enhanced Mobile Broadband). Mini-slot based transmission can be seen as an additional transmission scenario which provides URLLC (Ultra-Reliable Low-Latency Communication). To be compatible with both transmission scenarios, the RS design for mini-slot may be aligned with RS for a regular slot if possible, e.g. for system simplicity and interference friendly. If there is no aligning possible, e.g. due to the timing for the mini-slot transmission within a regular slot interval, the RS pattern of mini-slot may be optimized independently (e.g., regardless of the regular slot structure), e.g. when no RS pattern of the regular slot exists during the mini-slot transmission. The structure of the slot may be represented by a corresponding structure configuration.

Figure 9:
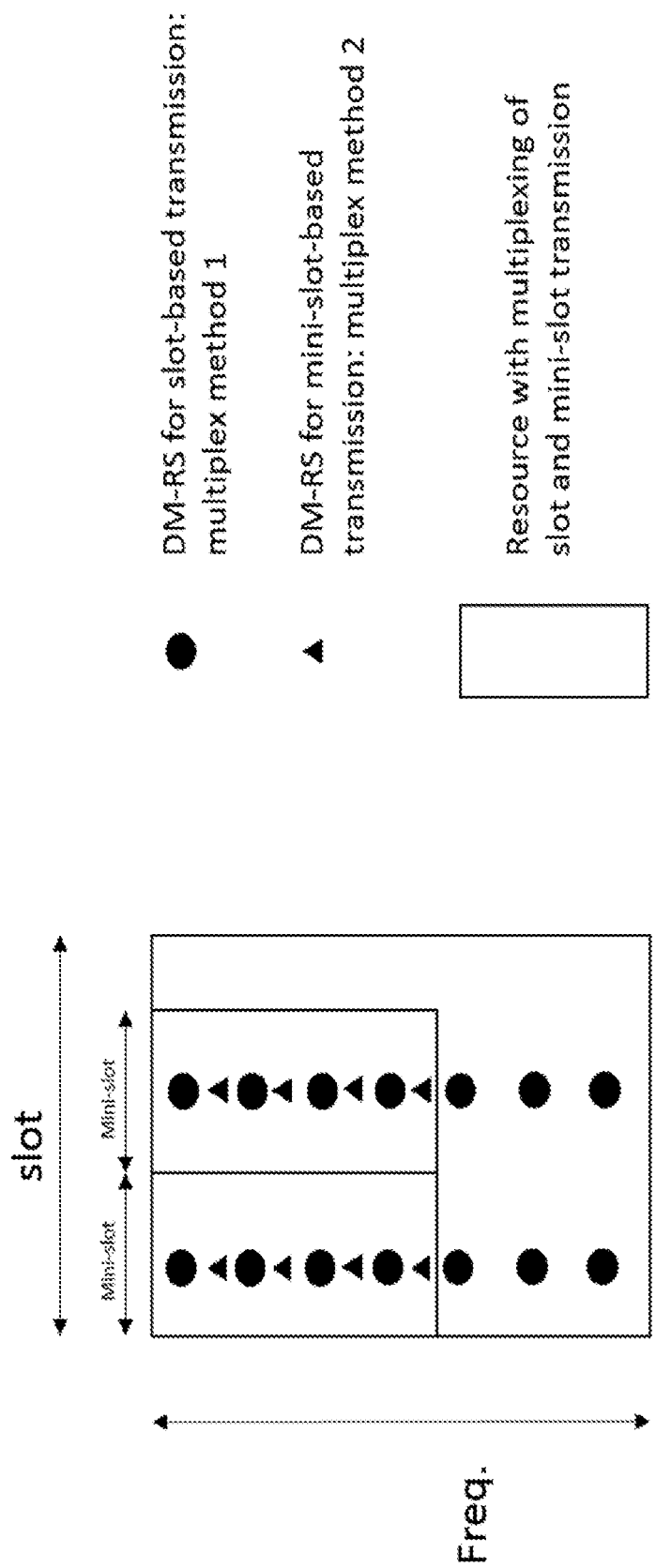
FIG. 9, showing an exemplary approach of multiplexing.
Figure 10:
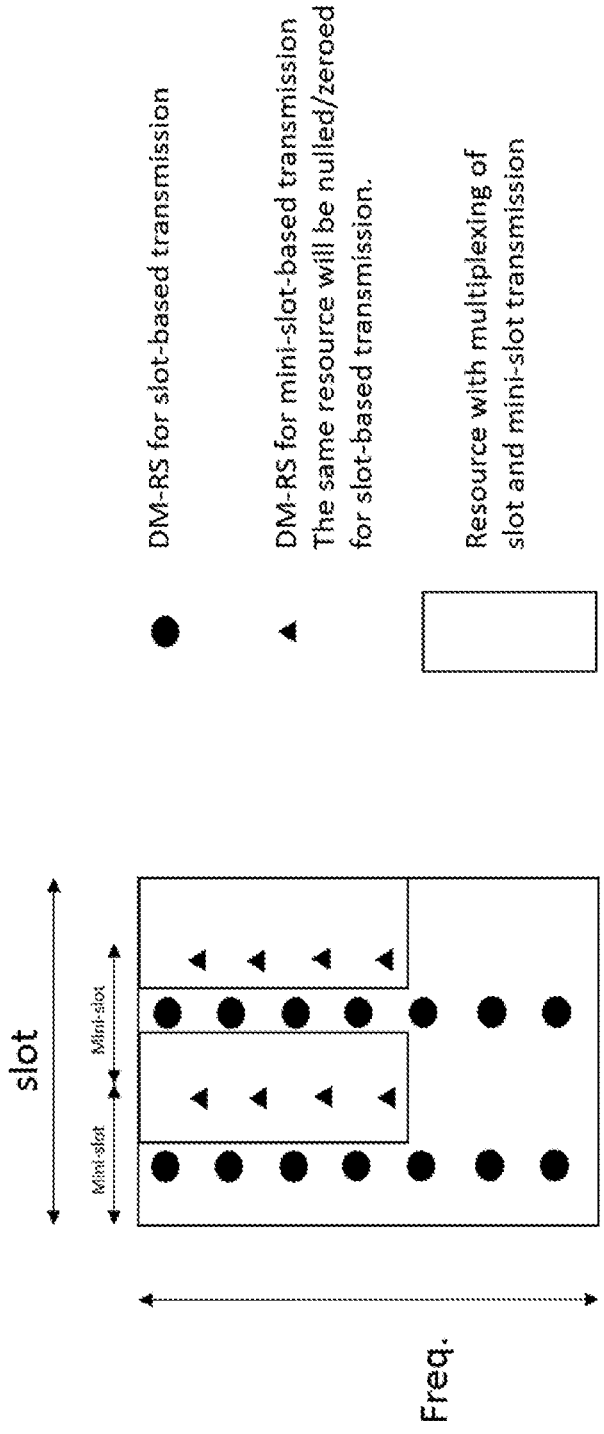
FIG. 10, showing an exemplary approach of multiplexing.

Different multiplexing approaches may be seen in FIGS. 9 and 10.

Therefore, the DM-RS design of mini-slot may take into account of the DM-RS pattern of regular slot based transmission and its own transmission parameters, e.g., the starting/ending position and its transmission length. A DM-RS design may in particular represent a timing of reference signaling (DM-RS signaling) in the mini-slot.

The DM-RS symbol position of mini-slot may depend on at least one of the following:
The mini-slot starting position in the slot-grid;
The mini-slot end position in the slot-gird;
The mini-slot length;
The DM-RS pattern of regular slot in the slot-grid.

The slot grid may be seen as representation of a structure configuration, which may define the underlying timing structure, and/or indicate timing for different kinds of signaling, e.g. reference signaling and/or control signaling (e.g., in a control region), and/or data signaling.

Approaches described herein facilitate aligning the DM-RS position of mini-slot transmission (timing of the reference signaling) with similar reference signaling for the regular slot based in a large extent, which reduces signalling overhead, and allows for better interference management for reference signals. Meanwhile, it reserves the possibility for independently optimizing the DM-RS pattern of mini-slot transmission, adaptive to the timing flexibility of mini-slot transmission.

Figure 11:
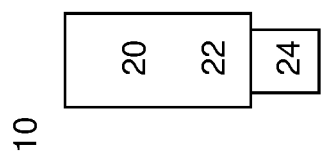
FIG. 11, showing an exemplary terminal or user equipment.

FIG. 11 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 12:
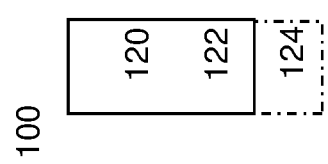
FIG. 12, showing an exemplary radio node like a network node.

FIG. 12 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein.

The timing of a mini-slot may generally be configured or configurable, in particular by the network and/or a network node. The timing may be configurable to start and/or end at any symbol of the transmission timing structure, in particular one or more slots.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

Different formats of for control information or control signaling may be considered, e.g. different formats for a control channel like a Physical Uplink Control Channel (PUCCH). PUCCH may carry control information or corresponding control signaling, e.g. Uplink Control Information (UCI), which may comprise acknowledgement signaling like HARQ feedback (ACK/NACK), and/or Channel Quality Information (CQI), and/or Scheduling Request (SR). One of the supported PUCCH formats may be short, and may e.g. occur at the end of a slot interval. Similar control information may be provided on a sidelink, e.g. as Sidelink Control Information (SCI), in particular on a (physical) sidelink control channel, like a (P)SCCH.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A mini-slot may be transmitted and/or received based on a configuration.

A configuration, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission and/or mini-slot may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

A configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

It may be considered that the scheduled transmission represents transmission on a physical channel, in particular a shared physical channel, for example a physical uplink shared channel or physical downlink shared channel. For such channels, semi-persistent configuring may be particularly suitable.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g., in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component.

A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

3GPP Third Generation Partnership Project
eNB Enhanced NodeB
CRS Cell-Specific Reference Signal
DM-RS De-Modulation Reference Signal
DCI Downlink Control Information
LTE Long Term Evolution
MIMO Multiple Input Multiple Output
RS Reference Signal
TM Transmission Mode
TTI Transmission Time Interval
UE User Equipment
URLLC Ultra-reliable low latency communications

The invention claimed is:

1. A method of operating a radio node in a radio access network, the method comprising at least one of transmitting and receiving reference signaling in a mini-slot, the timing of the reference signaling being determined based on a structure configuration of a transmission timing structure relative to which the mini-slot is positioned, the structure configuration indicating the timing of structure reference signaling, the structure reference signaling indicating the reference signaling, the transmission timing structure including at least a slot.

2. The method according to claim 1, wherein the reference signaling is at least one of demodulation reference signaling and UE-specific reference signaling.

3. The method according to claim 1, wherein the mini-slot is transmitted in one of a downlink and uplink and a sidelink.

4. The method according to claim 1, wherein the timing of reference signaling coincides with indicated timing of structure reference signaling.

5. The method according to claim 1, wherein the reference signaling in the mini-slot is multiplexed with structure reference signaling.

6. The method according to claim 1, wherein the reference signaling is associated to signaling on a physical channel in the mini-slot.

7. The method according to claim 1, wherein a transmission parameter of the reference signaling is determined based on the structure configuration.

8. The method according to claim 1, wherein the mini-slot is scheduled for transmission having a position in time relative to the transmission timing structure.

9. The method according to claim 1, wherein the transmission timing structure defines a timing grid.

10. The method according to claim 1, wherein a timing structure for at least one of the mini-slot and the transmission timing structure is based on a symbol time length, the symbol time length depending on a numerology.

11. The method according to claim 2, wherein the demodulation reference signaling is DM-RS signaling.

12. A radio node for a radio access network, the radio node comprising processing circuitry configured to cause the radio node to at least one of transmit and receive reference signaling in a mini-slot, the timing of the reference signaling being determined based on a structure configuration of a transmission timing structure relative to which the mini-slot is positioned, the structure configuration indicating the timing of structure reference signaling, the structure reference signaling indicating the reference signaling, the transmission timing structure including at least a slot.

13. The radio node according to claim 12, wherein the reference signaling is at least one of demodulation reference signaling and UE-specific reference signaling.

14. The radio node according to claim 13, wherein the demodulation reference signaling is DM-RS signaling.

15. The radio node according to claim 12, wherein the mini-slot is transmitted in one of a downlink, and uplink and a sidelink.

16. The radio node according to claim 12, wherein the timing of reference signaling coincides with indicated timing of structure reference signaling.

17. The radio node according to claim 12, wherein the reference signaling in the mini-slot is multiplexed with structure reference signaling.

18. A non-transitory computer storage medium storing an executable computer program comprising instructions that when executed, cause processing circuitry to at least one of control and perform a method of operating a radio node in a radio access network, the method comprising at least one of transmitting and receiving reference signaling in a mini-slot, the timing of the reference signaling being determined based on a structure configuration of a transmission timing structure relative to which the mini-slot is positioned, the structure configuration indicating the timing of structure reference signaling, the structure reference signaling indicating the reference signaling, the transmission timing structure including at least a slot.

* * * * *